W. W. TURNER & J. R. WOODS.
WEEDER.
APPLICATION FILED DEC. 1, 1909. RENEWED AUG. 7, 1912.
1,056,473.
Patented Mar. 18, 1913.
2 SHEETS—SHEET 1.
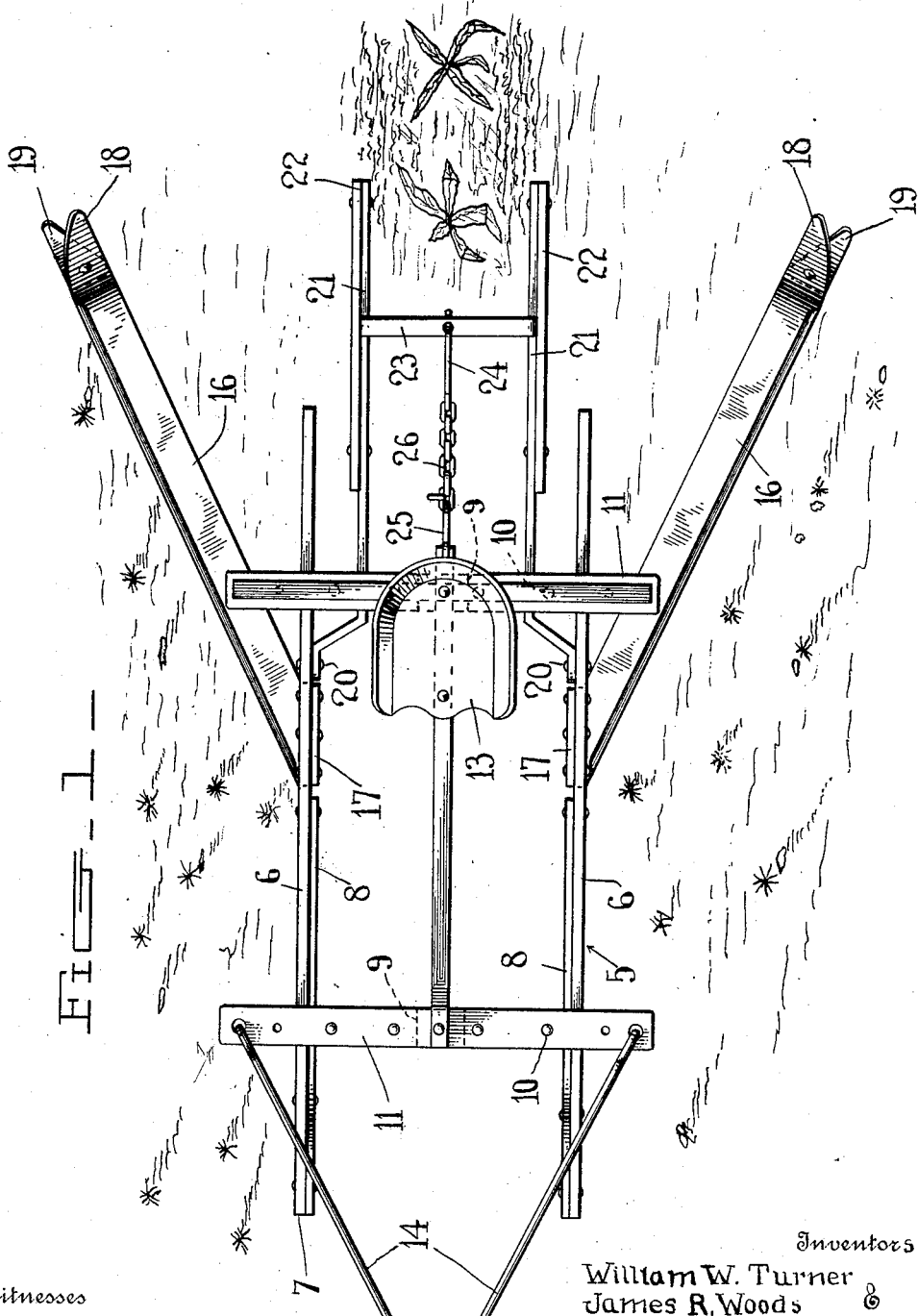
Witnesses
L. B. James
Inventors
William W. Turner
James R. Woods
Attorneys

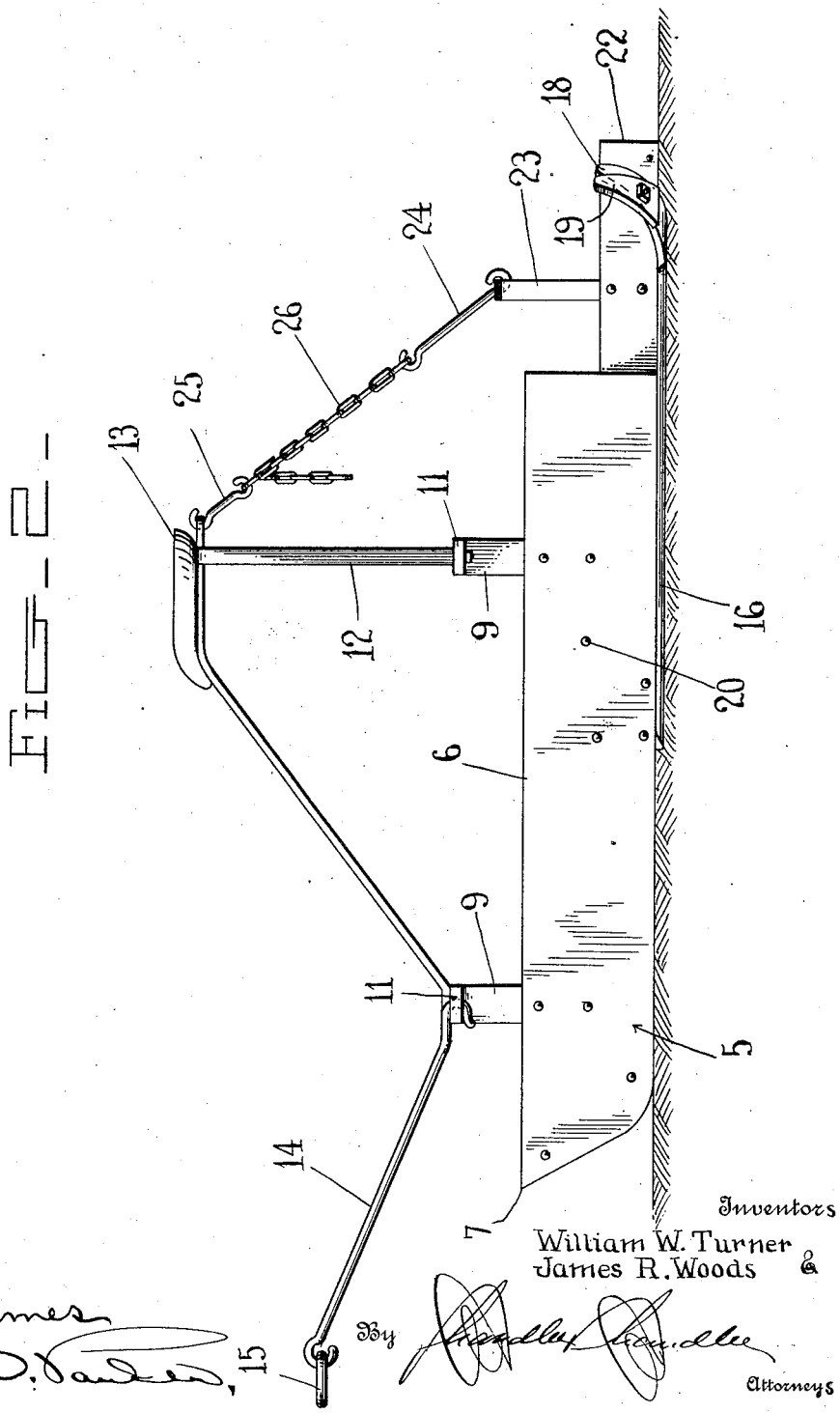

UNITED STATES PATENT OFFICE.

WILLIAM W. TURNER AND JAMES R. WOODS, OF SURPRISE, OKLAHOMA.

WEEDER.

1,056,473. Specification of Letters Patent. Patented Mar. 18, 1913.

Application filed December 1, 1909, Serial No. 530,740. Renewed August 7, 1912. Serial No. 713,944.

*To all whom it may concern:*

Be it known that we, WILLIAM W. TURNER and JAMES R. WOODS, citizens of the United States, residing at Surprise, in the county of Beaver, State of Oklahoma, have invented certain new and useful Improvements in Weeders; and we do hereby declare the following to be a full, clear, and exact description of the invention, such as will enable others skilled in the art to which it appertains to make and use the same.

The invention relates to a cultivator sled, and more particularly to the class of grubbing and weeding machines.

The primary object of the invention is the provision of a machine of this character in which standing weeds, roots or stalks at opposite sides of a growing row of plants may be cut down or removed from the ground during the travel or advancement of the machine through a field.

Another object of the invention is the provision of a machine of this character in which a row of growing plants will be protected at opposite sides thereof during the cutting down of weeds by the machine to clear out superfluous growth or the thinning of the crop in a field.

A further object of the invention is the provision of a machine of this character in which the runners and fenders thereof are adjustable at will to meet the required occasion or proper operation of the machine.

A still further object of the invention is the provision of a machine of the class described which is simple in construction, thoroughly reliable and efficient in operation and inexpensive in the manufacture.

With these and other objects in view, the invention consists in the construction, combination and arrangement of parts as will be hereinafter more fully described, illustrated in the accompanying drawings, which disclose the preferred form of embodiment of the invention, to enable those skilled in the art to carry the same into practice, and as pointed out in the claims hereunto appended.

In the drawings:—Figure 1 is a top plan view of a machine constructed in accordance with the invention. Fig. 2 is a side elevation thereof.

Similar reference characters indicate corresponding parts throughout the several views in the drawings.

Referring to the drawings by numerals, 5 designates generally the machine which comprises spaced vertical side runners 6, of corresponding size and shape with respect to each other and each having a curved forward end 7, and to the inner faces of these sections at their forward curved ends are fixed reinforcing strips 8, which latter are disposed for a distance of the runners at their treads or lower edges and serve to prevent the forward portions of the runners from cutting into the earth during the operation of the machine.

Near opposite extremities of the runners and fixed thereto are inverted L-shaped brackets 9, the horizontal portions of which contain spaced vertical apertures through which are passed bolt members 10, the latter adjustably connecting the said brackets to horizontal beams or cross bars 11, the same containing a series of spaced perforations for detachably receiving the bolt members 10 and in this manner the runners 6, may be brought close together or spaced apart to the required degree as the occasion may demand. It is of course understood that these runners 6, travel upon the ground on opposite sides of a row of growing plants during the operation of the machine. Fixed to and rising from the rear horizontal cross beams 11, are inwardly converging braces 12, the same having fixed thereto and supporting a seat 13, which is adapted to be occupied by the teamster or operator of the machine. Detachably connected to the forward horizontal cross beam 11 near its outer end are draft rods or links 14, the same supporting a coupling ring 15, to which latter is adapted to be connected the hitching or draft animals for transporting the machine through a field.

At the rear portions of the runners 6, are mounted outwardly diverging flat horizontal cutter bars or blades 16, each having formed at one end a vertical ear 17, which latter is fixed to the inner face of the runner, while the opposite end of this runner is bent to form an upwardly curved dirt throwing finger 18, to which latter is connected a supplemental dirt thrower finger 19, and these fingers are adapted to throw dirt and also the severed weeds inwardly toward the row of growing plants as the machine advances through the field. Directly in rear of the ears 17, of said blades 16, and connected to the inner faces of the runners 6, by pivots 20, are the inner ends of vertically swinging arms 21, the same having fixed thereto vertical shields or fenders 22, which latter are united by an inverted U-shaped yoke 23, and these shields are adapted to travel at opposite sides of a row of growing plants and extend a considerable distance in rear of the runners 6, of the machine. Connected centrally to the yoke 23, is a hook member 24, and also connected to one of the braces 12, is a hook member 25, and detachably and adjustably engaging these hook members are the links of a chain 26, and by means of which the fenders or shields 22, may be vertically adjusted at will.

It is obvious that the outwardly diverging cutter blades or bars 16, will sever growing weeds, roots, or stalks at opposite sides of a row of standing plants straddled by the runners 6, during the advancement or travel of the machine. The fenders or shields 22, will serve to protect the standing plants from the severed weeds and also dirt thrown inwardly by the dirt throwing fingers 18 and 19 of the cutter blades or bars on the machine.

From the foregoing it is thought the construction and operation of the invention will be clearly apparent without requiring a more extended explanation and therefore the same has been omitted.

What is claimed as new is:—

1. A weeder comprising spaced runners, cross beams connecting the same, a seat superposed upon said cross beam and having connections therewith, outwardly and rearwardly diverging cutting blades fixed at their forward ends to the runners and having their rear ends upturned to form dirt throwing fingers and movable fingers carried by said first mentioned fingers and adjustable with relation thereto.

2. A weeder of the class described comprising vertical spaced runners, means permitting lateral adjustment of said runners toward and away from each other, cutting blades disposed in a horizontal position and extending outwardly from the lower edge portions of the runners, said blades having forward cutting edges, and upturned rear extremities forming dirt throwing fingers and similarly formed fingers having oppositely curved portions coacting with the aforesaid fingers and adjustable with relation thereto.

In testimony whereof, we affix our signatures, in presence of two witnesses.

WILLIAM W. TURNER.
JAMES R. WOODS.

Witnesses:
  HARNEY MILLER,
  MARGARIT KERNS.

---

Copies of this patent may be obtained for five cents each, by addressing the "Commissioner of Patents, Washington, D. C."